United States Patent
Czerkie

[11] Patent Number: 6,062,382
[45] Date of Patent: May 16, 2000

[54] ROD HOLDER

[76] Inventor: David S. Czerkie, 2603 Bloominton Rd., East Peoria, Ill. 61611

[21] Appl. No.: 09/365,971
[22] Filed: Aug. 2, 1999
[51] Int. Cl.⁷ .................................................. B65D 85/20
[52] U.S. Cl. ..................................... 206/315.11; 206/443
[58] Field of Search ........................... 206/315.1, 315.11, 206/443

[56] References Cited

U.S. PATENT DOCUMENTS

| | | |
|---|---|---|
| 742,040 | 10/1903 | Kurtz . |
| 2,473,977 | 6/1949 | Tutton . |
| 2,783,875 | 3/1957 | Shabarick . |
| 3,057,464 | 10/1962 | Baggott . |
| 3,678,611 | 7/1972 | Files . |
| 4,813,173 | 3/1989 | Abbotoy ............................. 206/315.11 |
| 5,297,676 | 3/1994 | Coleman ............................ 206/315.11 |
| 5,425,194 | 6/1995 | Miller . |

*Primary Examiner*—Jacob K. Ackun
*Attorney, Agent, or Firm*—Don Moyer

[57] ABSTRACT

The rod holder comprises an outer sleeve having an outer slot; and an inner sleeve having an inner slot, the inner sleeve rotating within the outer sleeve and moving along the outer sleeve to open the inner slot and the outer slot to insertion of an elongated object, such as a fishing rod, and the inner sleeve rotating within the outer sleeve and moving along the outer sleeve to close the inner slot and the outer slot to secure the elongated object.

6 Claims, 3 Drawing Sheets

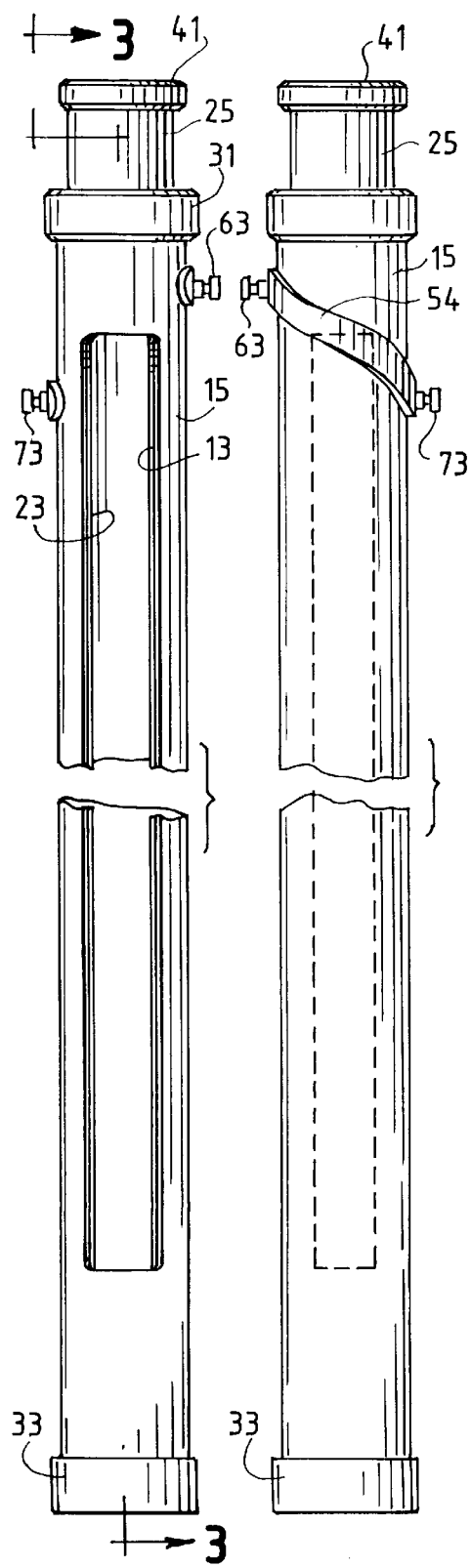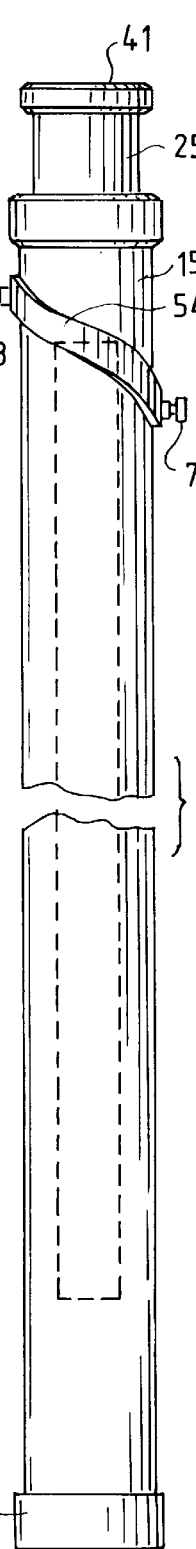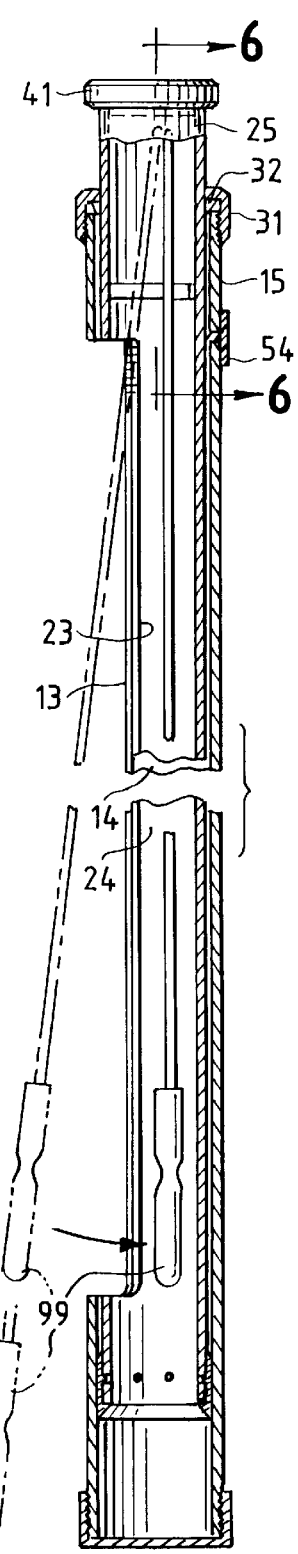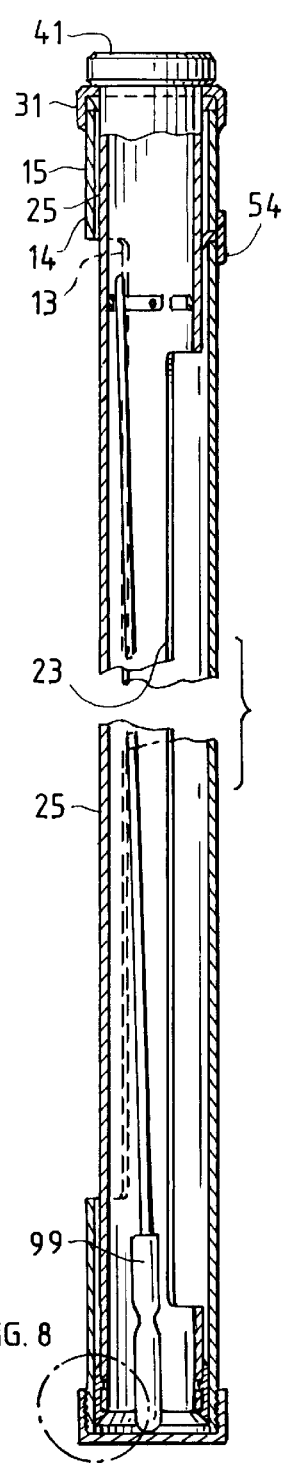

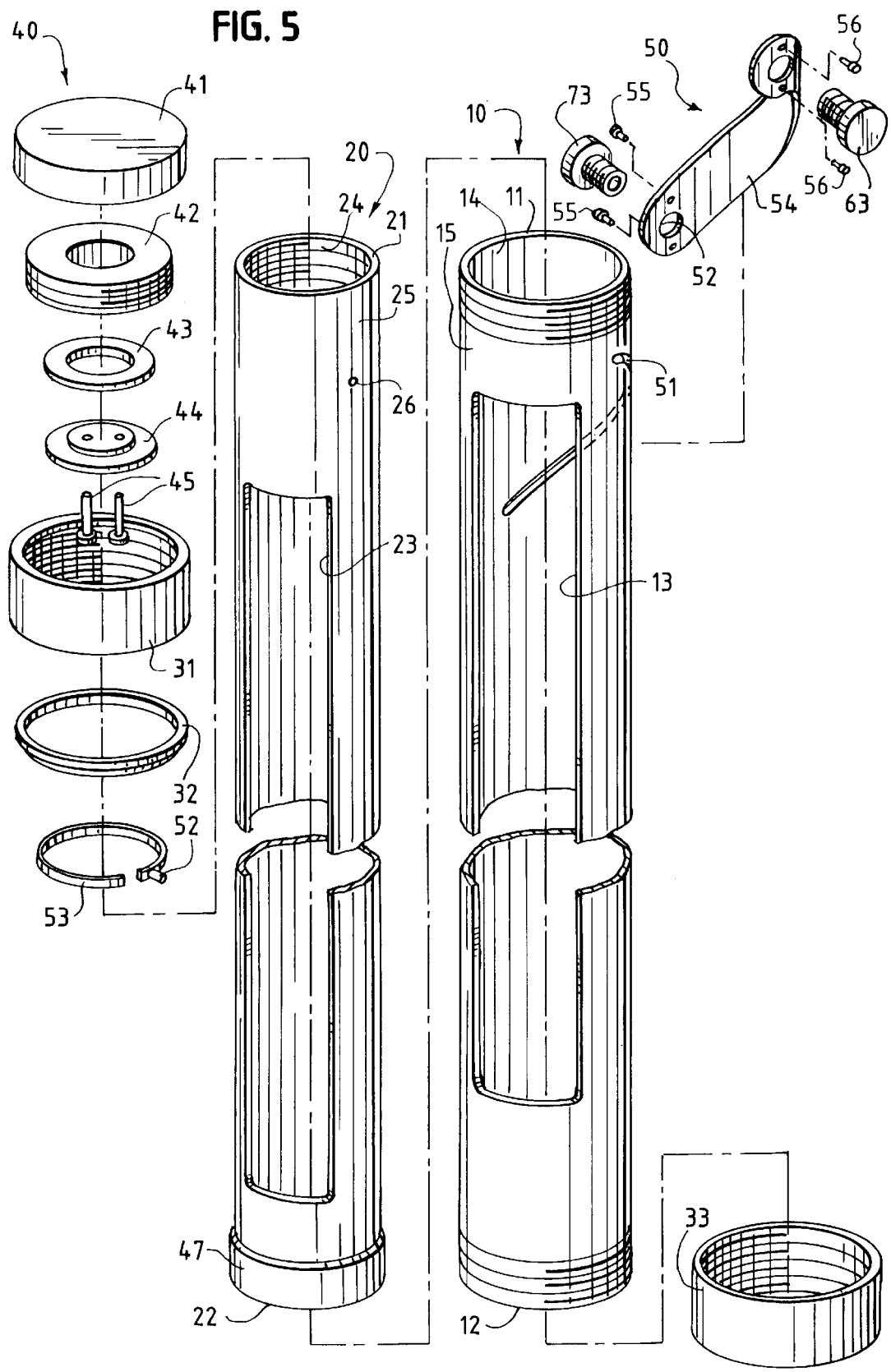

ROD HOLDER

BACKGROUND OF THE INVENTION

The invention is a holder for elongated, rodlike objects—especially adapted for holding fishing rods—the holder having opening motions wherein an inner sleeve rotates within and moves along an outer sleeve to open an inner slot and an outer slot so that the elongated, rod-like object can placed in the holder, and wherein the inner sleeve retraces the opening motions to close the inner slot and the outer slot and secure the object in the holder.

Prior art shows that workers have been seeking to devise useful holders for elongated, rod-like objects for a long time. For example, various end-loading and side-loading rod holders are shown by Kurtz in U.S. Pat. No. 742,040, by Tutton in U.S. Pat. No. 2,473,977, by Shabarick in U.S. Pat. No. 2,783,875, by Baggoft in U.S. Pat. No. 3,057,464, by Files in U.S. Pat. No. 3,678,611, and by Miller in U.S. Pat. No. 5,425,194. Of these, only Baggott shows a holder for which an opening motion aligns an inner slot and an outer slot. However, by teaching a holder which is curved, Baggott teaches away from the opening motions of the invention shown here.

The solution to this long outstanding problem shown here is based on the discovery of combined rotational and transnational opening motions not suggested in any prior art nor any combinations of prior art.

SUMMARY OF THE INVENTION

One form of the rod holder comprises an outer sleeve, the outer sleeve having an outer slot; and an inner sleeve, the inner sleeve having an inner slot, the inner sleeve rotating within the outer sleeve and moving along the outer sleeve to open the inner slot and the outer slot to insertion of an elongated object, and the inner sleeve rotating within the outer sleeve and moving along the outer sleeve to close the inner slot and the outer slot to secure the elongated object.

Alternate forms and objects of the invention will be comprehended in the drawings and detailed description, which will make other forms and objects obvious hereafter to persons skilled in the art.

BRIEF DESCRIPTION OF THE DRAWINGS

FIG. 1 is a front elevation of the rod holder;

FIG. 2 is a rear elevation of the rod holder;

FIG. 3 is a section of the rod holder taken along lines 3—3 of FIG. 1;

FIG. 4 is similar to FIG. 3 with the rod holder closed;

FIG. 5 is an exploded perspective of the rod holder;

DESCRIPTION OF THE PREFERRED EMBODIMENTS

The holder is shown open in FIG. 1 and FIG. 2 which views the holder from the side opposite that in FIG. 1. A fishing rod 99—an example of an elongated, rod-like object—is shown being loaded into the open holder FIG. 3, and is shown secured in the closed holder in FIG. 4. Opening motions—in which the inner sleeve rotates within the outer sleeve and moves along the outer sleeve—takes the holder from being closed as shown in FIG. 4 to being open as shown in FIG. 3, FIG. 2, and FIG. 1.

Figure 6:
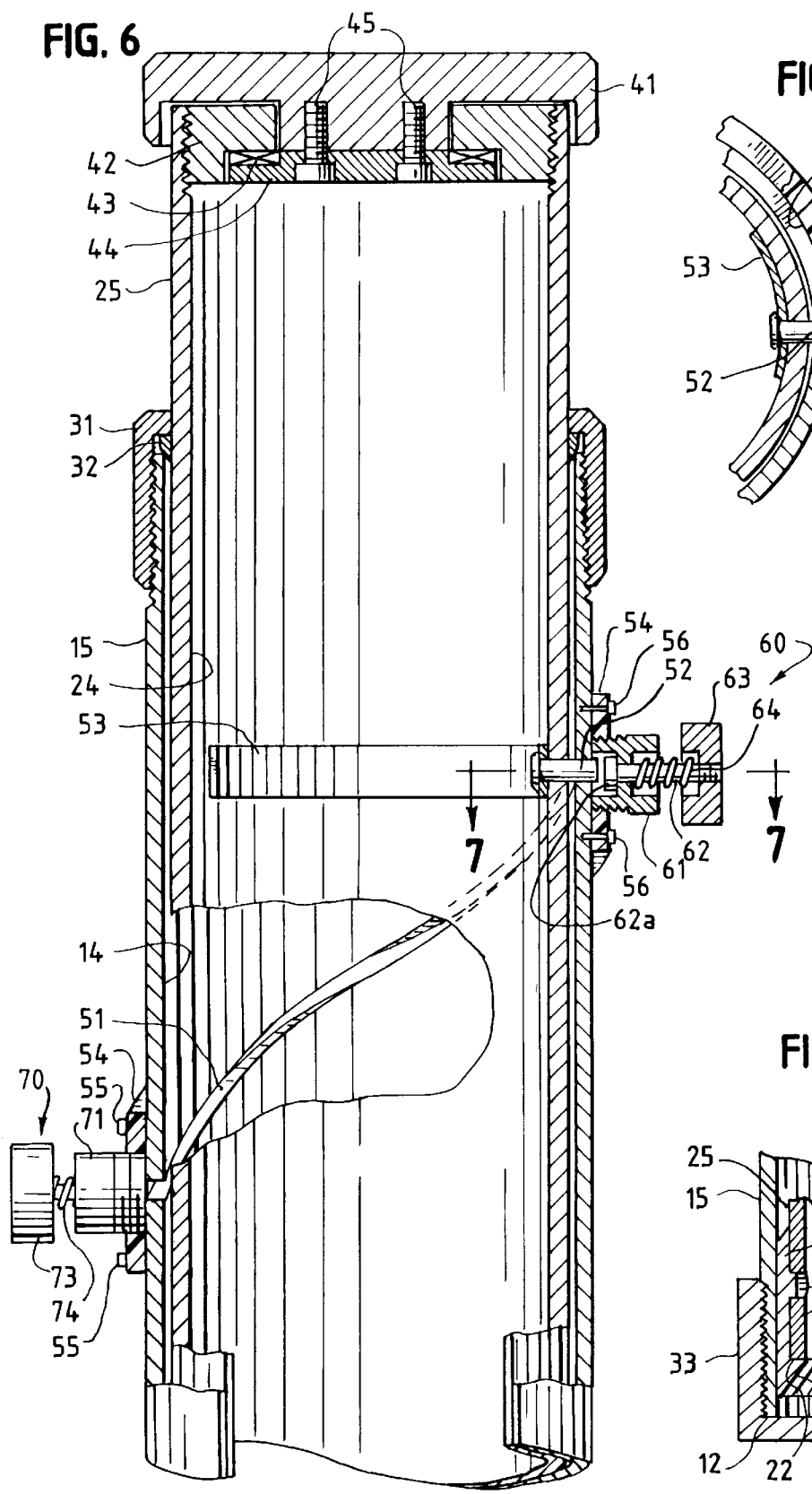
FIG. 6 is an enlarged section of the rod holder along lines 6—6 of FIG. 3.
Figure 7:
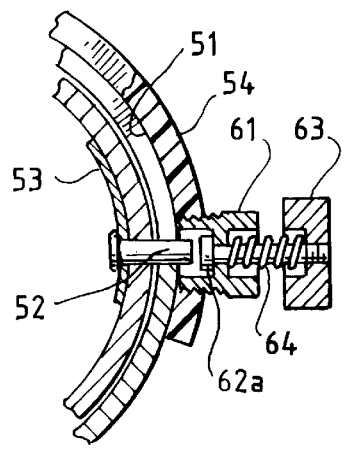
FIG. 7 is a cross sectional view of the rod holder along lines 7—7 of FIG. 6.

Several sub-assemblies of the holder—an outer sleeve 10, an inner sleeve 20, a motion coupler 50 which couples translation of the inner sleeve to rotation of the inner sleeve, a rotating assembly 40 which de-couples the rotation of the inner sleeve from the translation of the inner sleeve, an open lock 60, and a closed lock 70—are shown in FIG. 5 and FIG. 6.

The outer sleeve 10 has an outer top edge 11, an outer bottom edge 12, an outer slot 13, an outer, inner surface 14, and an outer surface 15. Similarly, an inner sleeve 20 has an inner top edge 21, an inner bottom edge 22, an inner slot 23, an inner surface 14, and an inner, outer surface 25. The holder is open when the inner sleeve has opened the inner slot and the outer slot by the opening motions which comprise the inner sleeve rotating within and moving along the outer sleeve. When the holder is open, an object can be placed through the outer slot and the inner slot into the inner sleeve as shown in FIG. 3. The holder is closed when the opening motions are retraced so that the inner sleeve and the outer sleeve are closed and the object is secured in the holder as shown in FIG. 4.

The outer sleeve is closed by a bottom cap 33 threaded onto the outer sleeve just above the outer bottom edge. An outer collar 31 is threaded onto the outer sleeve just below the outer top edge 11 with a tapered inner collar 32 held between the outer sleeve and the inner sleeve by the outer collar. As the outer collar is tightened onto the outer sleeve the inner collar is forced downward and inward against the inner sleeve and can hold the inner sleeve immobile relative to the outer sleeve.

The inner sleeve is closed with a rotating assembly 40 which has an annular element 42 threaded into the inner sleeve 20 just below the inner top edge 21 and has a top cap 41 attached by bolts 45 to a plate 44 which holds bearings 43 against the annular element. When the inner sleeve is moved along the outer sleeve by moving the top cap the inner sleeve can rotate under the top cap while the top cap does not rotate.

When the inner sleeve is moved along the outer sleeve by moving the top cap, a motion coupler 50 couples a rotation to this translation so that the inner sleeve rotates within the outer sleeve as the inner sleeve moves along—that is translates within—the outer sleeve. A track 51 in the outer sleeve extends part way along the outer sleeve and part way around the outer sleeve. The track is shown curved but it can have various shapes. Though the track need not extend fully through the outer sleeve, the track is shown extending through the outer sleeve where it is covered by a track cover 54 which is bolted onto the outer sleeve by bolts 55 and 56.

A follower 52 rides in the track, the follower is attached to a compression ring 53 which holds itself against the inner surface and which holds the follower through a follower hole 26 through the inner sleeve. Thus, as the inner sleeve is lifted and moved along the outer sleeve by moving the top cap the follower rides along the track and rotates the inner sleeve within the outer sleeve to open the inner slot 23 and the outer slot 13—while the top cap 41 does not rotate relative to the outer sleeve because of the rotation mechanism 40.

An open lock 60 assembly holds the holder open, and a closed lock 70 holds the holder closed. Each of the open lock and the closed lock have interchangeable elements. Each lock 60 and 70 has a base 61, and 71, which is threaded into the track cover. When the follower 52 extends into a base, 61 for example, the inner sleeve is immobile relative to the outer sleeve. Each lock has a piston head 62a (the corresponding piston head in 70 is not visible) attached to a piston 62, and 72, threaded into a lock cap 63, and 73, with a spring 62, and 72, holding the piston head away from the outer surface. When a lock cap 63, and 73, is pushed, a piston 62, and 72, will push the follower out of the corresponding base 61, and 71, so that the inner sleeve is no longer immobile relative to the outer sleeve.

Figure 8:
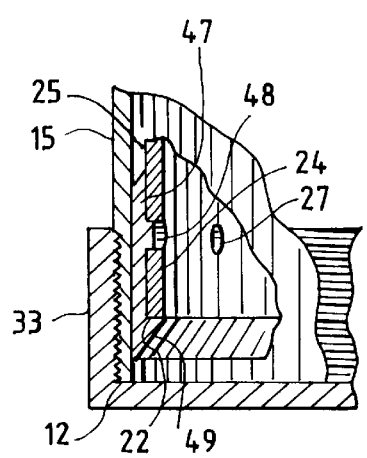
FIG. 8 is an enlargement of the area of the rod holder indicated in FIG. 4.

As shown in FIG. 8, a spacer 47 terminates the inner bottom. The spacer, which has protrusions 48 which fit into holes 27 into the inner sleeve aligns the inner sleeve with the outer sleeve. The spacer also has a shoulder 49 upon which the inner bottom edge 22 rests.

Other forms for the spacer 47 can be used. Similarly, other forms for the collar 31 and the inner collar 32 and for the bottom cap 33 can be used. Other forms for the locks can be used. Only one lock can be used. The locks can be left off and the working of the collar 31 and the inner collar 32 used to immobilize the inner sleeve relative to the outer sleeve.

Other forms for the motions coupler 50 can be used. The track could be in the inner sleeve with the follower extending from the outer sleeve. Either form can be located near the bottom edges. The track can have various shapes. A different mechanism—such as a spring which rotates as one end is pulled away from the other—could be used as the motions coupler.

Alternative mechanisms which de-couple the rotation from the translation can be used in place of the rotating mechanism 40. A de-coupling mechanism can be left off. As well, a mechanism to couple the rotation to the translation can be left off leaving both the translation and the rotation to be caused manually. The inner sleeve and the outer sleeve are shown as right circular cylinders, but other shapes can be used so long as the opening motions are possible.

Many alternate forms for the several sub-assemblies of the invention are possible so long as the holder has opening motions wherein an inner sleeve rotates within and moves along an outer sleeve to open the holder so that an elongated, rod-like object—such as a fishing rod—can be easily loaded into the holder, and wherein the opening motions are retraced to close the holder and secure the object.

Alternate forms for the outer sleeve, the inner sleeve, the rotating mechanism, the motions coupler, and the locks, and alternate connections among these elements will be obvious hereafter to persons skilled in the art. Therefore this invention is not limited to the particular examples shown and described here.

I claim:

1. A rod holder comprising:
   an outer sleeve, the outer sleeve having an outer slot; and
   an inner sleeve, the inner sleeve having an inner slot, the inner sleeve rotating within the outer sleeve and moving along the outer sleeve to open the inner slot and the outer slot to insertion of an elongated object, and the inner sleeve rotating within the outer sleeve and moving along the outer sleeve to close the inner slot and the outer slot to secure the elongated object.

2. The device of claim 1 further comprising a motions coupler which causes the inner sleeve to rotate within the outer sleeve when the inner sleeve moves along the outer sleeve.

3. The device of claim 2 further comprising a rotating mechanism which allows the inner sleeve to be moved along and rotated within the outer sleeve by moving a top cap which does not rotate relative to the outer sleeve.

4. The device of claim 1 further comprising a lock which, when locked, immobilizes the inner sleeve relative to the outer sleeve.

5. A rod holder comprising:
   an outer sleeve, the outer sleeve having an outer slot;
   an inner sleeve, the inner sleeve having an inner slot, the inner sleeve rotating within the outer sleeve and moving along the outer sleeve to open the inner slot and the outer slot to insertion of an elongated object, and the inner sleeve rotating within the outer sleeve and moving along the outer sleeve to close the inner slot and the outer slot to secure the elongated object; and
   a motions coupler which causes the inner sleeve to be rotating within the outer sleeve when the inner sleeve moves along the outer sleeve.

6. A rod holder comprising:
   an outer sleeve, the outer sleeve having an outer slot;
   an inner sleeve, the inner sleeve having an inner slot, the inner sleeve rotating within the outer sleeve and moving along the outer sleeve to open the inner slot and the outer slot to insertion of an elongated object, and the inner sleeve rotating within the outer sleeve and moving along the outer sleeve to close the inner slot and the outer slot to secure the elongated object;
   a motions coupler which causes the inner sleeve to be rotating within the outer sleeve when the inner sleeve moves along the outer sleeve;
   a rotating mechanism which allows the inner sleeve to be moved along the outer sleeve by moving a top cap which does not rotate with the inner sleeve; and
   a lock which, when locked, immobilizes the inner sleeve relative to the outer sleeve.

* * * * *